US011604540B1

(12) United States Patent
Winokur et al.

(10) Patent No.: US 11,604,540 B1
(45) Date of Patent: Mar. 14, 2023

(54) MULTI-SCAN TOUCH SENSING SYSTEM AND METHOD

(71) Applicant: Apple Inc., Cupertino, CA (US)

(72) Inventors: Eric S. Winokur, Redwood City, CA (US); Andreas Johannes Koeberl, San Francisco, CA (US); John Brandon Laflen, Elk Grove, CA (US); Mir Hamza Mahmood, Mountain View, CA (US); Narmadha Vijayakumar, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/652,071

(22) Filed: Feb. 22, 2022

Related U.S. Application Data

(60) Provisional application No. 63/247,028, filed on Sep. 22, 2021.

(51) Int. Cl.
*G06F 3/041* (2006.01)

(52) U.S. Cl.
CPC .......... *G06F 3/0418* (2013.01); *G06F 3/0412* (2013.01); *G06F 3/041662* (2019.05)

(58) Field of Classification Search
CPC . G06F 3/0412; G06F 3/0418; G06F 3/041662

USPC .................................................. 345/173, 174
See application file for complete search history.

(56) References Cited

U.S. PATENT DOCUMENTS

| | | | |
|---|---|---|---|
| 8,536,880 B2 | 9/2013 | Philipp | |
| 9,817,535 B2 | 11/2017 | Shepelev | |
| 9,864,466 B2 | 1/2018 | Goudarzi | |
| 10,128,836 B1 * | 11/2018 | Buttolo | H03K 17/955 |
| 10,372,271 B2 | 8/2019 | Matlick et al. | |
| 10,592,055 B2 * | 3/2020 | Lee | G06F 3/0443 |
| 2015/0153870 A1 | 6/2015 | Lee et al. | |
| 2021/0064165 A1 | 3/2021 | Krah et al. | |

* cited by examiner

*Primary Examiner* — Calvin C Ma
(74) *Attorney, Agent, or Firm* — Kubota & Basol LLP

(57) ABSTRACT

In some examples, a touch screen can perform a first touch scan to obtain first touch data and a second touch scan to obtain second touch data. The touch data resulting from the second touch scan may exclude respective noise (e.g., display-to-touch crosstalk (DTX) noise) or may include a reduced amount of the respective noise. In some examples, the electronic device can subtract the second touch data from the first touch data to obtain an estimate of the noise in the first touch data. In some examples, this noise estimate can be subtracted from the first touch data and an action can be performed based on the first touch data with the noise estimate removed.

20 Claims, 8 Drawing Sheets

MULTI-SCAN TOUCH SENSING SYSTEM AND METHOD

CROSS-REFERENCE TO RELATED APPLICATIONS

This application claims the benefit of U.S. Provisional Application No. 63/247,028, filed Sep. 22, 2021, the content of which is incorporated herein by reference in its entirety for all purposes.

FIELD OF THE DISCLOSURE

This relates generally to touch detection and, more specifically, to reducing or removing display-to-touch screen crosstalk noise from touch data.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some examples, touch electrodes can have strong capacitive coupling to cathodes of the display of the touch screen. This coupling can lead to display-to-touch crosstalk (DTX) for example.

BRIEF SUMMARY OF THE DISCLOSURE

Embodiments described herein relate generally to touch detection and, more specifically, to reducing or removing display-to-touch screen crosstalk noise from touch data. In some examples, a touch screen can include touch circuitry and display circuitry, which can be in close proximity to one another. For example, a large capacitance can be formed between one or more touch electrodes of the touch screen and display circuitry, such as a display cathode. In some examples, the display signals applied to the display cathode to display an image can be modeled as a variable impedance between the cathode and AC ground. This variable impedance can cause variation of the electrical time constant of the cathode, which can result in display-to-touch crosstalk (DTX) noise in the touch data. In some examples, it can be advantageous to perform a touch scan with an increased or extended touch sensing period that allows the charge coupled into the cathode to "settle" during touch sensing (e.g., irrespective of the variable electrical time constant of the cathode), thereby providing touch data with removed or reduced DTX noise. In some examples, it may only be possible to obtain touch data with the DTX noise reduced or removed for a subset of touch electrodes, so techniques can be used to estimate DTX noise for additional (e.g., all) touch electrodes for one or more touch scans performed with shorter sensing periods.

For example, the electronic device can perform a first touch scan (e.g., a bootstrap scan, a non-bootstrap scan) with a first touch sensing period and a second touch scan (e.g., an extended bootstrap scan) with a second touch sensing period. The touch data resulting from the second touch scan may exclude noise of a respective type (e.g., display-to-touch crosstalk noise), or may include a reduced amount of the noise of the respective type. In some examples, the electronic device can compute a difference between the first and second scans, in which the touch data are removed, and estimate the noise from the resulting difference scan. For example, if the second scan includes touch data from a subset of touch electrodes, the noise estimate can be a noise estimate for the subset of electrodes during the first scan. In some examples, this noise estimate can be up-sampled to generate an estimate of the noise in the touch data for the first scan for all touch electrodes. The noise estimate can then be removed from the touch data from the first scan and an operation can be performed based on the touch data with the noise estimate removed, for example.

In some examples, estimated noise at a subset of touch electrodes used to perform an extended bootstrap scan can be used to estimate the noise at additional electrodes used in a bootstrap touch scan by up-sampling the noise estimate of the subset of touch electrodes used to perform the extended bootstrap scan. Then, in some examples, the estimated noise can be removed from the touch data from the bootstrap touch scan. In some examples, the noise estimate for the bootstrap scan, obtained based on the noise measurement of the extended bootstrap scan, can be used to estimate noise in a non-bootstrap scan. Estimation of noise in the non-bootstrap scan can be made using a second up-sampling method. In some cases, the up-sampling method may be the same as for the bootstrap scan, but with a different scaling coefficient. In some examples, the scaling coefficient and the upsampling methods are obtained during a calibration procedure. For example, the noise estimate for the bootstrap scan can be scaled with the coefficient to obtain a noise estimate in the non-bootstrap scan. In some examples, the estimated noise can be removed from the touch data obtained in the non-bootstrap scan. In some examples, an operation can be performed at the touch screen based on one or more of the bootstrap touch data with the noise removed and the non-bootstrap touch data with the noise removed.

DETAILED DESCRIPTION OF THE DISCLOSURE

Figure 1A:
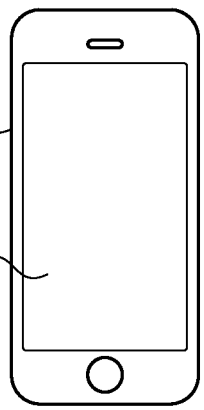
FIGS. 1A-1E illustrate example systems that can use multi-scan touch sensing techniques according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Embodiments described herein relate generally to touch detection and, more specifically, to reducing or removing display-to-touch screen crosstalk noise from touch data. In some examples, a touch screen can include touch circuitry and display circuitry, which can be in close proximity to one another. For example, a large capacitance can be formed between one or more touch electrodes of the touch screen and display circuitry, such as a display cathode. In some examples, the display signals applied to the display cathode to display an image can be modeled as a variable impedance between the cathode and AC ground. This variable impedance can cause variation of the electrical time constant of the cathode, which can result in display-to-touch crosstalk (DTX) noise in the touch data. In some examples, it can be advantageous to perform a touch scan with an increased or extended touch sensing period that allows the charge coupled into the cathode to "settle" during touch sensing (e.g., irrespective of the variable electrical time constant of the cathode), thereby providing touch data with removed or reduced DTX noise. In some examples, it may only be possible to obtain touch data with the DTX noise reduced or removed for a subset of touch electrodes, so techniques can be used to estimate DTX noise for additional (e.g., all) touch electrodes for one or more touch scans performed with shorter sensing periods.

For example, the electronic device can perform a first touch scan (e.g., a bootstrap scan, a non-bootstrap scan) with a first touch sensing period and a second touch scan (e.g., an extended bootstrap scan) with a second touch sensing period. The touch data resulting from the second touch scan may exclude noise of a respective type (e.g., display-to-touch crosstalk noise), or may include a reduced amount of the noise of the respective type. In some examples, the electronic device can compute a difference between the first and second scans, in which the touch data are removed, and estimate the noise from the resulting difference scan. For example, if the second scan includes touch data from a subset of touch electrodes, the noise estimate can be a noise estimate for the subset of electrodes during the first scan. In some examples, this noise estimate can be up-sampled to generate an estimate of the noise in the touch data for the first scan for all touch electrodes. The noise estimate can then be removed from the touch data from the first scan and an operation can be performed based on the touch data with the noise estimate removed, for example.

In some examples, estimated noise at a subset of touch electrodes used to perform an extended bootstrap scan can be used to estimate the noise at additional electrodes used in a bootstrap touch scan by up-sampling the noise estimate of the subset of touch electrodes used to perform the extended bootstrap scan. Then, in some examples, the estimated noise can be removed from the touch data from the bootstrap touch scan. In some examples, the noise estimate for the bootstrap scan, obtained based on the noise measurement of the extended bootstrap scan, can be used to estimate noise in a non-bootstrap scan. Estimation of noise in the non-bootstrap scan can be made using a second up-sampling method. In some cases, the up-sampling method may be the same as for the bootstrap scan, but with a different scaling coefficient. In some examples, the scaling coefficient and the upsampling methods are obtained during a calibration procedure. For example, the noise estimate for the bootstrap scan can be scaled with the coefficient to obtain a noise estimate in the non-bootstrap scan. In some examples, the estimated noise can be removed from the touch data obtained in the non-bootstrap scan. In some examples, an operation can be performed at the touch screen based on one or more of the bootstrap touch data with the noise removed and the non-bootstrap touch data with the noise removed.

Figure 1B:
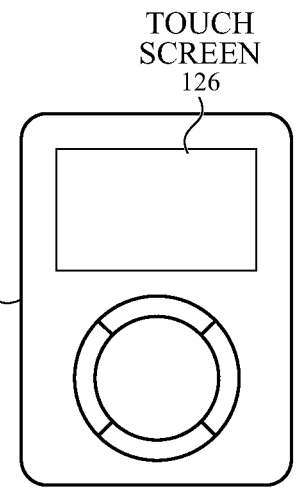
Figure 1C:
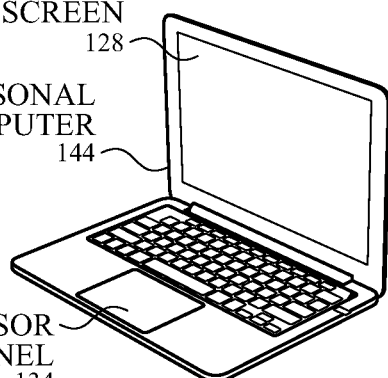
Figure 1D:
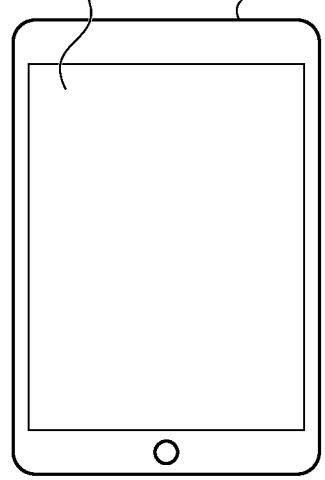
Figure 1E:
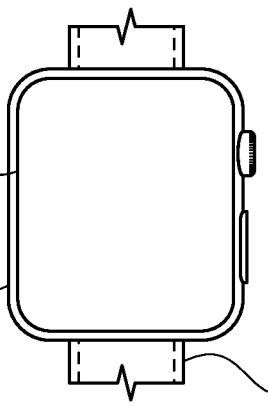

FIGS. 1A-1E illustrate example systems that can use multi-scan touch sensing techniques according to examples of the disclosure. FIG. 1A illustrates an example mobile telephone 136 that includes a touch screen 124 that can use multi-scan touch sensing techniques according to examples of the disclosure. FIG. 1B illustrates an example digital media player 140 that includes a touch screen 126 that can use multi-scan touch sensing techniques according to examples of the disclosure. FIG. 1C illustrates an example personal computer 144 that includes a touch screen 128 and a touch sensor panel 134 (e.g., a trackpad) that can use multi-scan touch sensing techniques according to examples of the disclosure. FIG. 1D illustrates an example tablet computing device 148 that includes a touch screen 130 that can use multi-scan touch sensing techniques according to examples of the disclosure. FIG. 1E illustrates an example wearable device 150 that includes a touch screen 132 and can be attached to a user using a strap 152 and that can use multi-scan touch sensing techniques according to examples of the disclosure. It is understood that a touch screen and multi-scan touch sensing techniques can be implemented in other devices, including future devices not yet in the marketplace. Additionally, it should be understood that although the disclosure herein primarily focuses on touch screens, the disclosure of multi-scan touch sensing techniques can be implemented for devices including touch sensor panels (and displays) that may not be implemented as a touch screen.

In some examples, touch screens 124, 126, 128, 130 and 132 and touch sensor panel 134 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can support multi-touch, single touch, projection scan, etc., touch functionality.

In some examples, touch screens 124, 126, 128, 130 and 132 and touch sensor panel 134 can be based on mutual capacitance. A mutual capacitance based touch system can include electrodes arranged as drive and sense lines (e.g., as described below with reference to FIG. 4A) that may cross over each other on different layers (in a double-sided configuration) or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 and touch sensor panel 134 can be based on mutual capacitance and/or self-capacitance. The electrodes can be arranged as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation, electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
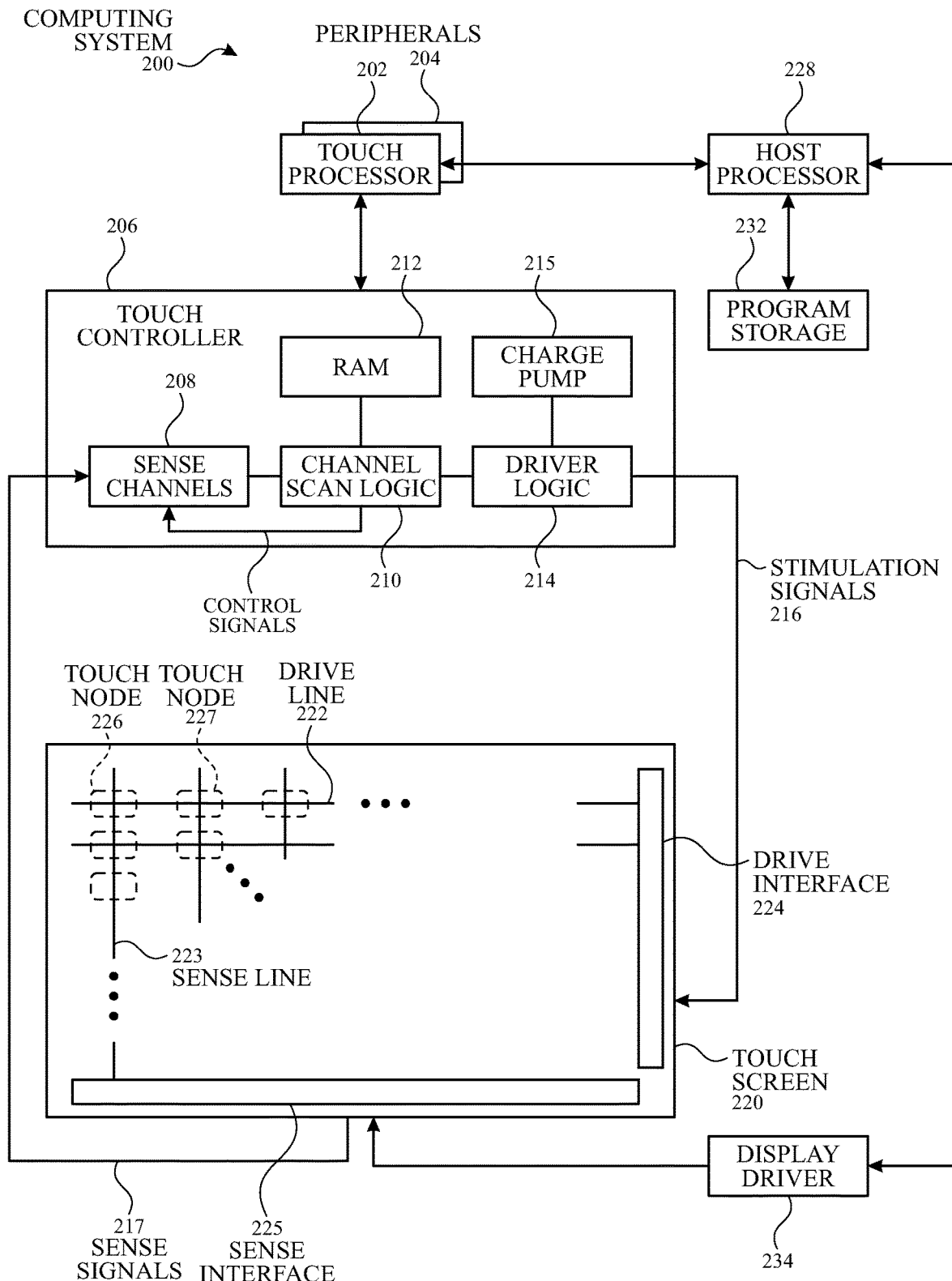
FIG. 2 illustrates an example computing system including a touch screen that can use multi-scan touch sensing techniques according to examples of the disclosure.

FIG. 2 illustrates an example computing system including a touch screen that can use multi-scan touch sensing techniques according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers, co-processor(s) and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, capturing an image with a camera in communication with the electronic device, exiting an idle/sleep state of the electronic device, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224 and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to driver logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
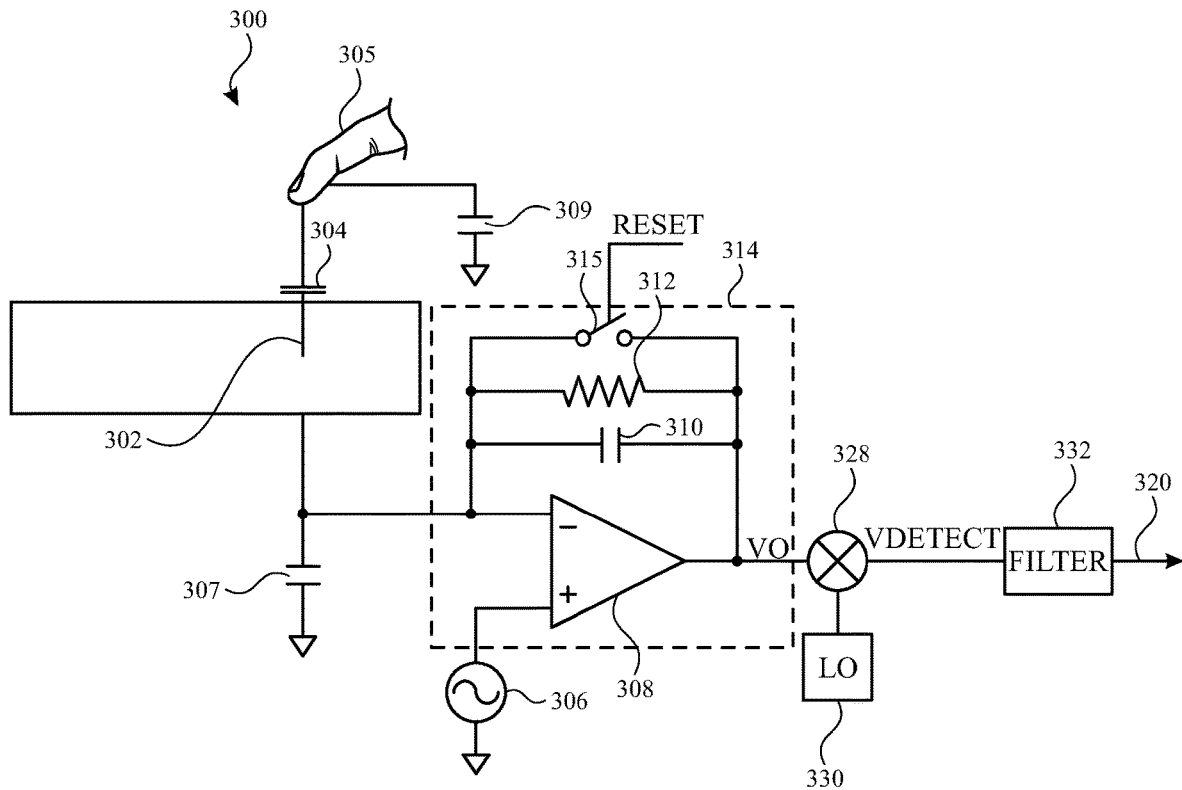
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be approximated as capacitance 304 and can be much smaller than the body capacitance 309 and thus can dominate the overall ground capacitance. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. The output voltage amplitude of amplifier 308 is approximately Vac*(1+XFB/(XCS+XCSNS)), where XFB, XCS and XCSNS are the impedances of the feedback network, capacitors 307 and 304, respectively, at the frequency of Vac. The output of the amplifier 308 can be demodulated at the frequency of stimulus signal Vac (homodyne or synchronous detection) by demodulator 328 and then integrated (or averaged) by filter 332. The resulting output 320 can be used by a processor to determine the presence of a proximity or touch event, or the output can be inputted into a discrete logic network to determine the presence of a proximity or touch event. Note that in some examples, demodulator can be an I/Q demodulator. In some examples, the demodulator can be in the digital domain, where the output of amplifier 308 could be digitized first by an ADC before performing digital demodulation.

Figure 3B:
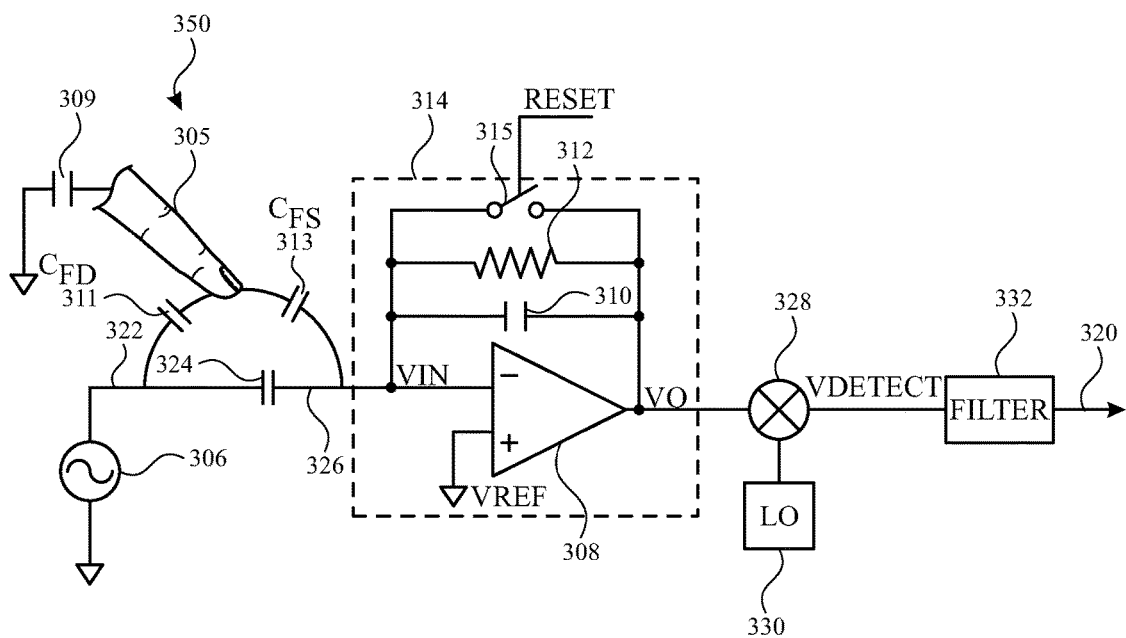
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease) (e.g., due to capacitive coupling indicated by capacitances CFD 311 and CFS 313, which can be formed between drive line 322, finger 305 and sense line 326). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310, and the impedance of mutual capacitance 324. The output of the amplifier 308 is demodulated at the frequency of stimulus signal Vac (homodyne or synchronous detection) by demodulator 328 and then integrated (or averaged) by filter 332. Note that in some examples, demodulator can be an I/Q demodulator. In some examples, the demodulator (or I/Q demodulator) can be in the digital domain, where the output of amplifier 308 can be digitized first by an ADC before performing demodulation and filtering.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
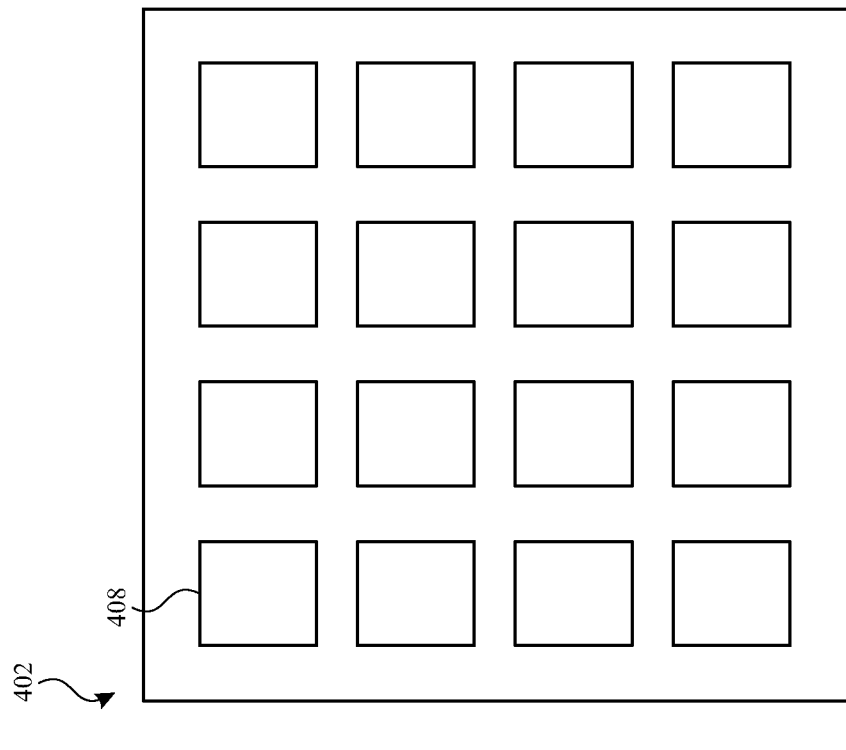
FIG. 4B illustrates touch screen with touch node electrodes arranged in a pixelated touch node electrode configuration according to examples of the disclosure.
Figure 4A:
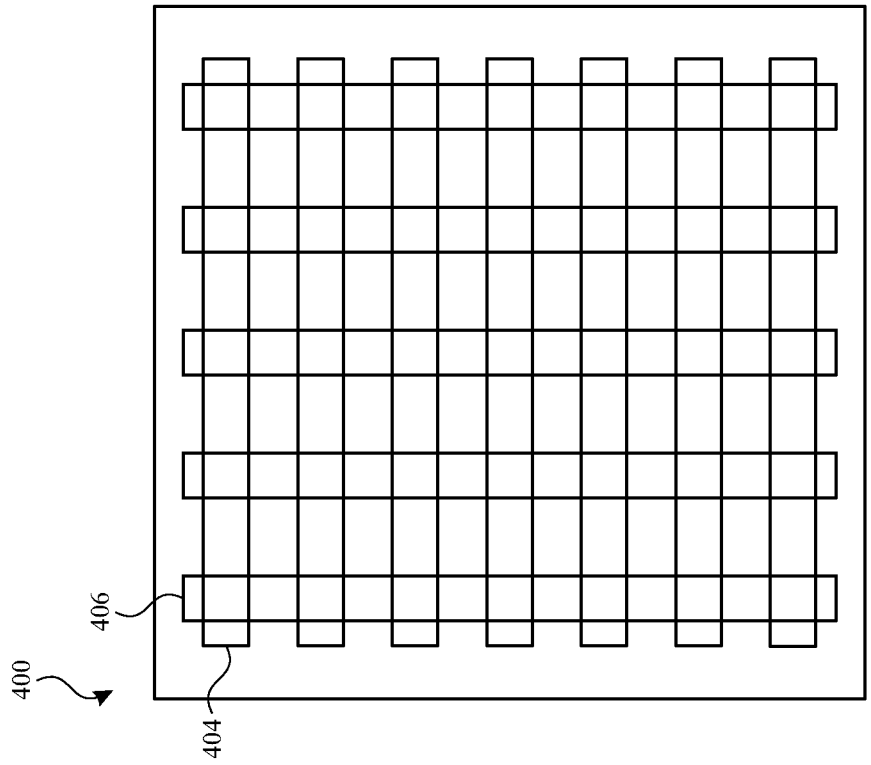
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400. Although the touch electrodes 404 and 406 are illustrated as being rectangle-shaped, it should be understood that other electrode shapes and structures (e.g., diamond-, square-, stripe- or circle-shaped electrodes connected by jumpers or vias) are possible.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402. Although touch node electrodes 408 are illustrated as having rectangular shapes, it should be understood that other electrode shapes (e.g., diamonds, circles, stripes etc.) and structures are possible.

Figure 5A:
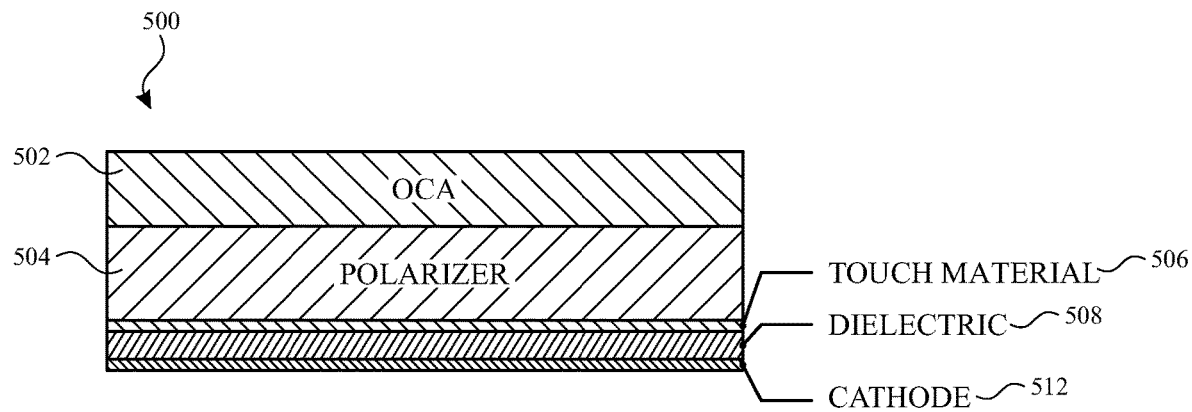
FIG. 5A illustrates a cross-section of an exemplary touch screen according to some examples of the disclosure.

FIG. 5A illustrates a cross-section of an exemplary touch screen 500 according to some examples of the disclosure. In some examples, the touch screen 500 can have an "on-cell" structure in which the touch electrodes are overlaid on the display screen in close proximity (e.g., within 5, 10, 13, 15, etc. micrometers of each other), for example. In some examples, the touch screen 500 can include an optically clear adhesive 502, a polarizer 504, touch material 506, a dielectric layer 508, and display cathode 512.

In some examples, touch material 506 can form one or more touch electrodes of the touch screen. In some examples, the touch electrodes can be disposed in rows and columns like touch electrodes 404 and 406 illustrated in FIG. 4A. In some examples, the touch electrodes can be disposed as pixelated touch electrodes like touch electrodes 408 illustrated in FIG. 4B. In some examples, the touch electrodes can be formed from a metal mesh material. In some examples, the touch electrodes can be formed from a (e.g., substantially) transparent conductive material, such as ITO, AZO, and the like so that an image displayed on the display (e.g., including cathode 512, described below) can be visible to the user through touch material 506.

In some examples, the touch screen 500 can further include display components including cathode 512. During operation of the touch screen to display an image, display circuitry can apply voltages to the display circuits and cathodes 512 of various pixels of the touch screen 500 corresponding to the image to be displayed.

The touch screen 500 can further include dielectric layer 508, for example. In some examples, the dielectric layer 508 can be formed from (e.g., substantially) transparent materials so that an image displayed on the display (e.g., including cathode 512) can be visible to the user through dielectric layer 508. In some examples, dielectric layer 508 can include an electrically insulating material to prevent direct electrical coupling between the touch material 506 and the cathode 512, though, as will be described below, in some examples, capacitive coupling between the cathode 512 and the touch material 506 can occur. In some examples, dielectric layer 508 can include a material that is resistant to oxidization and other corrosion and can prevent oxidization and corrosion of the cathode 512 and/or touch material 506 during device manufacturing and/or operation.

In some examples, touch screen 500 can further include optically clear adhesive 502. In some examples, optically clear adhesive 502 can be used to adhere the polarizer 504 to a cover material (e.g., a cover glass or another cover material). Optically clear adhesive 502 can be (e.g., substantially) transparent to enable viewing of an image displayed by a display (e.g., including cathode 512) through the optically clear adhesive 502. Polarizer 504 can include materials with optical properties to enhance the quality of the images presented by the display.

Figure 5B:
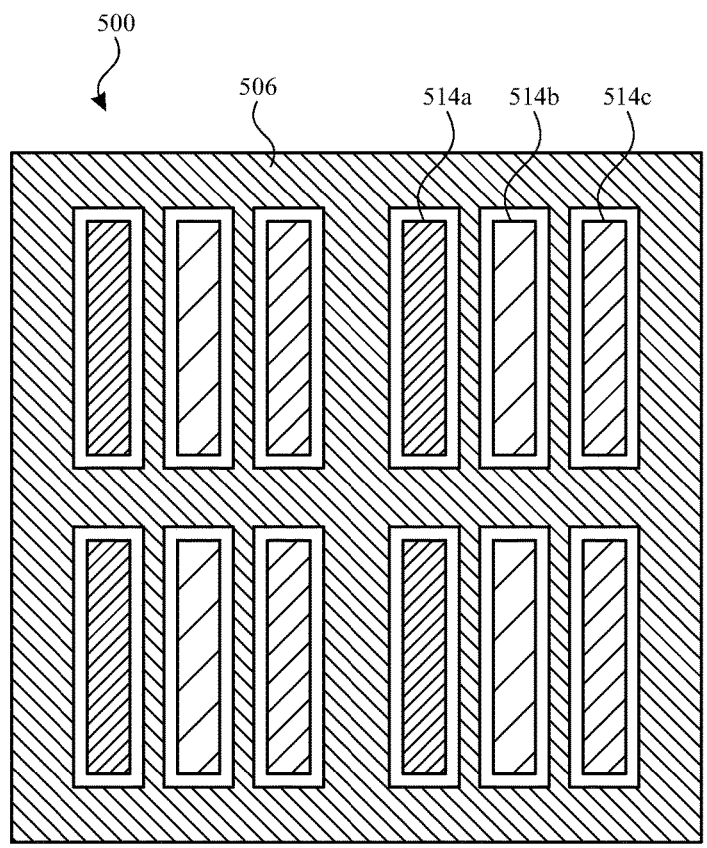
FIG. 5B illustrates a top view of a portion of exemplary touch screen according to some examples of the disclosure.

FIG. 5B illustrates a top view of a portion of exemplary touch screen 500 according to some examples of the disclosure. In some examples, touch screen 500 can include subpixels 514a-c and touch material 506. In some examples, the subpixels 514a-c can include cathodes 512 and can be used to display an image on the touch screen 500. For example, the subpixels can include red subpixels 514a, green subpixels 514b, and blue subpixels 514c. As shown in FIG. 5B, the touch material 506 can be disposed at locations on the surface of the touch screen 500 between the subpixels 514a-c, as opposed to at locations overlapping the subpixels 514a-c, for example. In this way, in some examples, an image displayed using subpixels 514a-c can be visible with (e.g., substantially) no visual artifacts caused by the touch material 506.

Touch screen 500 can be used to display images and sense (e.g., conductive) objects proximate to the touch screen 500, such as fingers, styluses, and the like. In some examples, the display operations and touch sensing operations can occur during different phases of operation of the touch screen 500 in a time-multiplexed manner. In some examples, however, even though display operations and touch operations are time-multiplexed, due to the close proximity of the touch material 506 and the display cathode 512 in touch screen 500, for example, charge from touch pixel sensing can be injected into the cathode 512 and can take time to settle, which can cause variation in the electrical time constant of the cathode 512. Differences in this electrical time constant will change the charge measured by the touch system, causing the display-to-touch crosstalk (DTX). Thus, in some examples, it can be desirable to calculate the DTX noise for each frame of touch data to remove or reduce DTX in the touch data.

Figure 6:
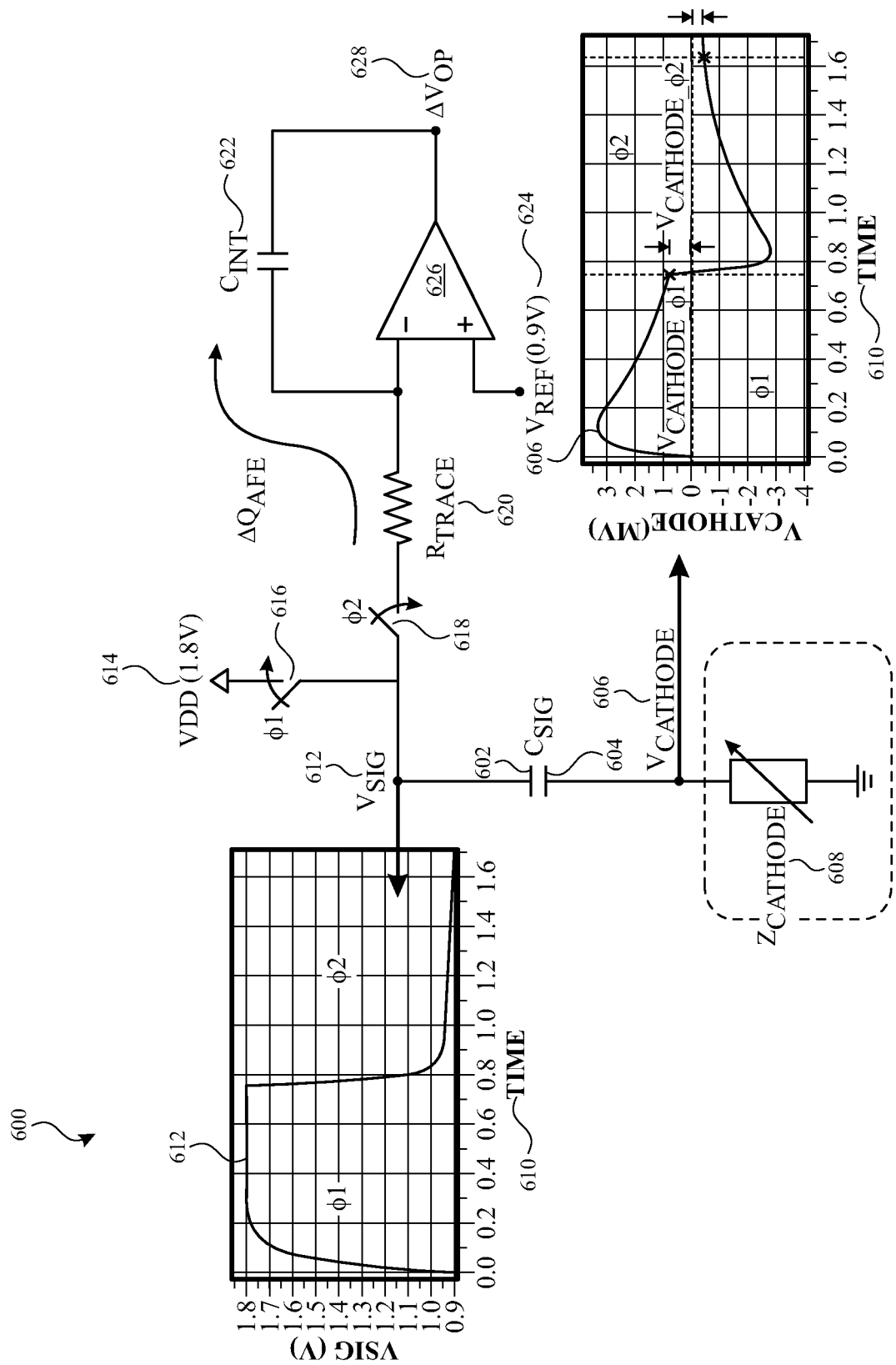
FIG. 6 illustrates a model of operation of a touch screen according to some examples of the disclosure.

FIG. 6 illustrates a model 600 of operation of a touch screen 500 according to some examples of the disclosure. For example, model 600 includes the capacitance Csig between the touch metal 602 and cathode 602, a voltage source 614, and an amplifier 626 with a feedback capacitor Cint 622. In some examples, the voltage Vsig 612 of the touch metal 602 can vary over time and can be sensed at the output 628 of amplifier 622. In some examples, the voltage Vsig 612 applied to the touch metal 602 can capacitively couple to the cathode; thus, the voltage Vcathode 606 can vary over time. In some examples, the impedance Zcathode of the cathode 606 at the start of the touch phase can vary depending on the image being displayed by the touch screen, which can impact the voltage Vcathode 606 coupled to the cathode 604 and, in turn, the voltage 612 of the touch metal 602 sensed during touch sensing. It should be understood that, in some examples, the impedance Zcathode of model 600 is not necessarily the impedance of the cathode in reality but, rather, is used to model the interaction between the cathode 604 and the display circuits underneath the cathode.

In some examples, switches 616 and 618 can be used to alternate coupling the touch metal 602 to voltage source 614 during a first phase Φ1 and coupling the touch metal 602 to amplifier 626 (e.g., via a trace having an impedance Vtrace 620) during a second phase Φ2. In some examples, during Φ1, charge can accumulate on the touch metal 602 and can discharge while being sensed using amplifier 626 and Cint 622 during Φ2. In some examples, due to close proximity of the touch metal 602 and the cathode 604 in the touch screen, capacitive coupling Csig between the touch metal 602 and cathode 604 can cause the voltage of the touch metal Vsig 602 to be affected by the voltage Vcathode 606 of the cathode.

In some examples, the voltage Vcathode 606 of the cathode 604 can initially increase during Φ1 and decrease at a rate that depends on the impedance Zcathode 608 of the cathode. As described above, the impedance Zcathode 608 of the cathode varies depending on the image being displayed by the touch screen. Thus, the voltage Vcathode 606 of the cathode 604 at the beginning of Φ2 can also vary depending on the image being displayed by the touch screen, for example. Likewise, in some examples, at the beginning of Φ2, the voltage Vcathode at the cathode 604 can initially decrease before increasing at a rate that depends on the impedance Zcathode 608 of the cathode, so the voltage Vcathode 606 at the beginning of Φ1 can also depend on the impedance Zcathode 608 of the cathode, which can vary depending on the image being displayed by the touch screen. Therefore, for example, display-to-touch crosstalk can vary from frame to frame of touch data. In some examples, it can be advantageous to measure the display-to-touch crosstalk to reduce or remove it from the touch data for each frame of touch data.

Figure 7:
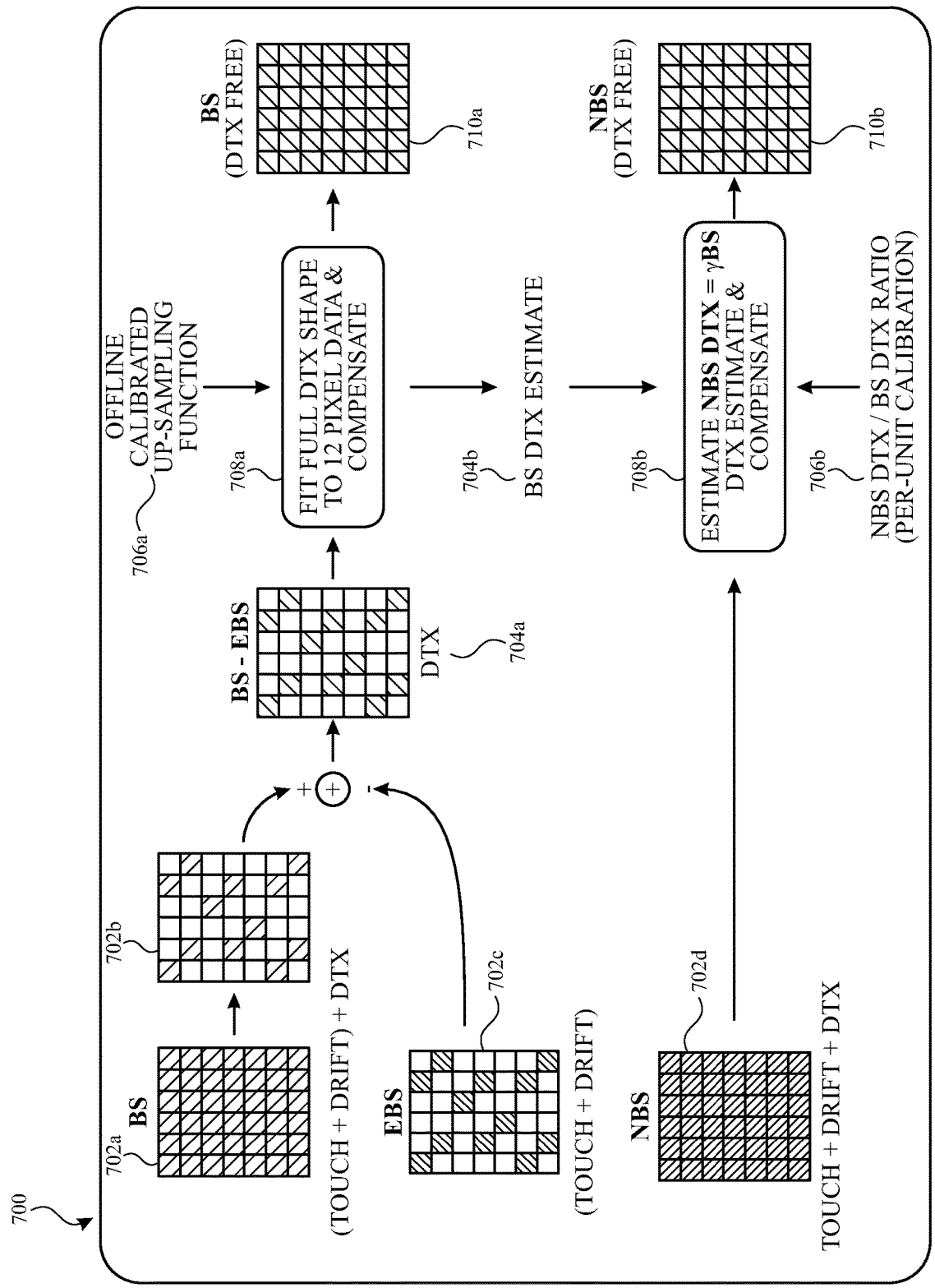
FIG. 7 illustrates a block diagram of scans and calculations that can be performed to estimate and reduce or remove noise from touch data according to some examples of the disclosure.

FIG. 7 illustrates a block diagram 700 of scans and calculations that can be performed to estimate and reduce or remove crosstalk from touch data according to some examples of the disclosure. In some examples, the techniques illustrated in block diagram 700 can be applied to a touch screen 500 corresponding to model 600 described above with reference to FIGS. 5A-6.

In some examples, multiple touch scans of different types can be performed by the touch screen in each frame of touch data. For example, the touch screen can perform a bootstrap scan 702a, an extended bootstrap scan 702c, and a non-bootstrap scan 702d. In some examples, performing the bootstrap scan can include applying a drive signal to (e.g., all of) the touch electrodes of the touch screen and sensing self-capacitance at (e.g., a subset of) the touch electrodes. Driving touch electrodes that are not sensed in addition to the touch electrodes to be sensed can reduce parasitic capacitance between the touch electrodes to be sensed and the touch electrodes that are not sensed during a particular bootstrap scan, for example. In some examples, the touch screen can perform multiple bootstrap scans per frame of touch data in order to sense self capacitance of (e.g., all of) the touch electrodes in each frame of touch data over the course of multiple scans. In some examples, performing the bootstrap scan 702a can include driving and sensing (e.g., all of) the touch electrodes of the touch screen at the same time to obtain touch signals at (e.g., all of) the touch electrodes of the touch screen in a single scan. In some examples, the bootstrap scan 702a can use touch sensing periods Φ1 and Φ2 illustrated in FIG. 6. Although all touch sensors can be sensed using bootstrap scan 702a, in some examples, touch data obtained using the bootstrap scan 702a can include DTX noise because the sensing period of the bootstrap scan 702a can be too short to allow the charge injected into the display cathode to settle, thereby injecting DTX noise into the touch data due to variation in the electrical time constant of the cathode caused by the injected charge.

In some examples, the touch screen can also perform a non-bootstrap scan 702d. In some examples, self-capacitances of (e.g., all of) the touch electrodes of the touch screen can be sensed using the non-bootstrap scan 702d. In some examples, performing the non-bootstrap scan 702d can include applying drive signals to the touch electrodes to be sensed and applying a grounding signal different from the drive signal to one or more touch electrodes not being sensed and/or allowing one or more electrodes not being sensed to "float" relative to ground. In some examples, multiple non-bootstrap scans 702d can be performed during each frame of touch sensing to sense (e.g., all of) the touch electrodes of the touch screen in each frame of touch data. In some examples, the driving and sensing periods of the non-bootstrap scan 702d are the same as the driving and sensing periods (e.g., Φ1 and Φ2 described with reference to FIG. 6) of the bootstrap scan 702a.

In some examples, the touch screen can perform an extended bootstrap scan 702c during the touch sensing phase of the touch screen. For example, performing the extended bootstrap scan 702c can include applying a drive signal to (e.g., all of) the touch electrodes of the touch screen and sensing self-capacitance at (e.g., a subset of) the touch electrodes. In some examples, the sensing period of the extended bootstrap scan 702c can be longer (e.g., 1.2, 1.5, 2, 3, 4, etc. times as long) as the sensing period (e.g., Φ1 and Φ2) of the bootstrap scan 702a. In some examples, due to limitations on the amount of time for touch sensing and the number of sense channels included in the electronic device that includes the touch screen, the self capacitance may only be sensed at a subset of touch electrodes during the extended bootstrap scan (e.g., in one or more scans) of the frame of touch data. For example, the shaded electrodes of extended bootstrap scan 702c in FIG. 7 can be sensed and the electrodes that are not shaded are driven but not sensed. In some examples, the longer sensing period of the extended bootstrap scan 702c is sufficient to allow the charge injected into the display cathode to settle, thereby mitigating inconsistencies caused by the variation in the electrical time constant of the cathode caused by the injected charge. Thus, for example, the touch data of the extended bootstrap scan 702c may not include DTX noise (or may include significantly less DTX noise than the touch data from the bootstrap scan 702a and the non-bootstrap scan 702d). In some examples, the electrodes to be sensed during the extended bootstrap scan 702c can be selected based on a spatial correlation of the DTX noise determined during a calibration process of the touch screen. For example, electrodes can be selected that will enable the electronic device to (e.g., most) accurately estimate the DTX noise at the remaining touch electrodes, compared to the accuracy achieved using a different subset of touch electrodes.

In some examples, the electronic device including the touchscreen can use the touch data without (or with a reduced amount of) DTX noise at a subset of the touch electrodes to remove or reduce the DTX noise in the touch data from the bootstrap scan 702a. For example, the DTX noise included in touch data from the bootstrap scan 702a at the subset of touch electrodes sensed during the extended bootstrap scan 702c can be calculated by subtracting the extended bootstrap scan 702c touch data from the bootstrap scan 702a touch data for the touch electrodes sensed during the extended bootstrap scan 702c to obtain DTX data 704a. In some examples, the DTX data 704a for the subset of touch electrodes can be up-sampled 708a to estimate the DTX data 704a for all touch electrodes of the touch screen. In some examples, the up-sampling 708a can be based on a calibration performed on each unit at the factory (e.g., before use of the touch screen) that determines an up-sampling function 706a corresponding to a relationship between the DTX noise at a subset of touch electrodes (e.g., the touch electrodes sampled during the extended bootstrap scan 702c) and the DTX noise at the rest of the touch electrodes. The electronic device including the touch screen can subtract the estimated DTX data for all touch electrodes from the bootstrap scan 702a touch data to obtain bootstrap touch data 710a that does not include, or includes a reduced magnitude of, the DTX noise.

In some examples, the estimated DTX noise 704b for the bootstrap scan 702a can be used to estimate the DTX noise in the non-bootstrap scan 702d touch data. In some examples, a calibration can be performed on a per-unit basis at the factory (e.g., before the touch screen is used) to determine a relationship (e.g., a coefficient 706b y) between DTX noise in touch data from a bootstrap scan 702a and DTX noise in touch data for a non-bootstrap scan 702d. Then, for example, the electronic device including the touch screen can use the estimated DTX noise 704b of the bootstrap scan 702a and the coefficient 706b y to estimate 708b the DTX noise of the non-bootstrap scan 702d. In some examples, the estimated DTX noise of the non-bootstrap scan 702d can be subtracted from the touch data of the non-bootstrap scan 702d to obtain non-bootstrap scan touch data 710b that does not include (or includes a reduced amount of) DTX noise.

In some examples, the electronic device can use the bootstrap touch data 710a without (or with a reduced amount of) DTX noise and the non-bootstrap touch data 710b without (or with a reduced amount of) DTX noise to determine a location, shape, size, intensity, etc. of an object proximate to the touch screen. The electronic device can perform an operation (e.g., make a selection, change a setting, initiate communication with another electronic device, etc.) in accordance with the detection of the proximate object, for example. In some examples, the electronic device can perform the operations described with reference to FIG. 7 for every frame of touch data obtained at the touch screen.

Figure 8:
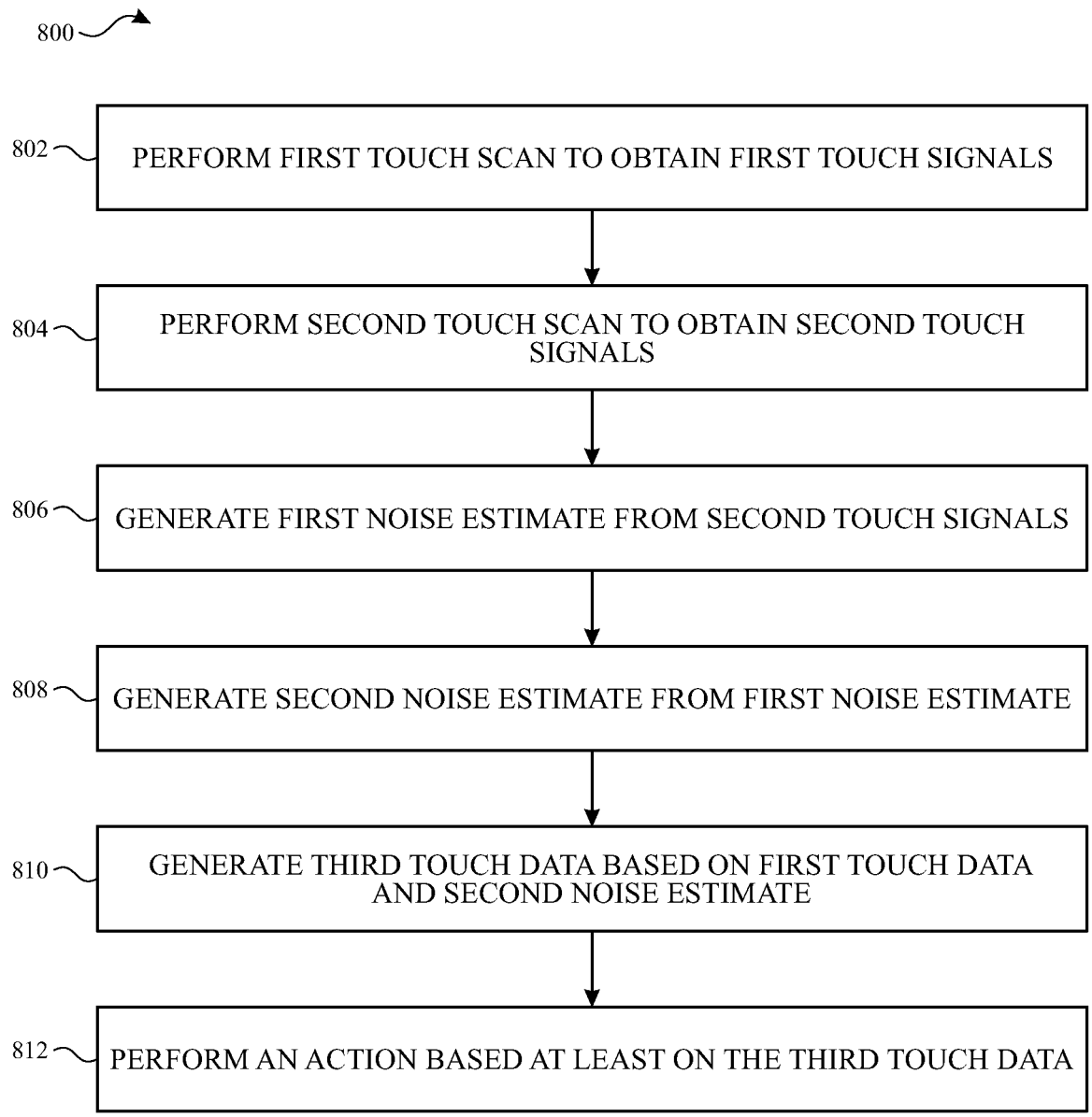
FIG. 8 illustrates an exemplary method for detecting touch with DTX noise reduced or removed according to some examples of the disclosure.

FIG. 8 illustrates an exemplary method 800 for detecting touch with DTX noise reduced or removed according to some examples of the disclosure. In some examples, the method 800 can be performed by an electronic device including or in communication with a touch screen. In some example, the method 800 can be stored on a non-transitory computer readable storage medium that, when executed by an electronic device, can cause the electronic device to perform the method 800. Method 800 can be performed in conjunction with one or more examples described above with reference to one or more of FIGS. 1A-7, for example. The order in which the steps of method 800 are described below should not be construed as limiting the order in which the steps are performed. For example, steps can be performed in an order different from the order in which they are described below and/or one or more steps can be repeated, altered, and/or skipped without departing from the scope of the disclosure. Moreover, it should be understood that labels such as "first" and "second" merely distinguish elements from one another and should not be construed as indicating the order in which particular steps are performed within the scope of the disclosure. For example, a "second" operation may be performed before a "first" operation without departing from the scope of the disclosure.

In some examples, the method 800 can include performing 802 a first touch scan to obtain first touch signals. For example, the electronic device can perform a bootstrap scan 702a as described above with reference to FIG. 7. In some examples, a first number of touch electrodes (e.g., all of the touch electrodes) can be sensed during the first touch scan. A self-capacitance of the touch electrodes can be sensed during the first touch scan, for example. In some examples, the first touch data can be non-bootstrap touch data 702d described above with reference to FIG. 7.

In some examples, the method 800 can include performing 804 a second touch scan to obtain second touch signals. For example, the electronic device can perform an extended bootstrap scan 702c that includes sensing a subset of the touch electrodes as described above with reference to FIG. 7. In some examples, performing the second touch scan can include sensing a self-capacitance of the subset of touch electrodes. In some examples, the second touch scan can include a longer sensing period than the first touch scan. In some examples, the first touch scan can be performed before the second touch scan. In some examples, the second touch scan can be performed before the first touch scan.

In some examples, the method 800 can include generating 806 a first noise estimate from the second touch signals. For example, the second touch signals may not include DTX noise or may include less DTX noise than the DTX noise included in the first touch signals. In some examples, the electronic device can subtract the second touch signals from the first touch signals for the electrodes that were sensed during the second touch scan. The difference between these touch signals can be an estimate of the DTX noise at the touch electrodes that were sensed during the second touch scan, for example.

In some examples, the method 800 can further include generating 808 a second noise estimate from the first noise estimate. In some examples, the second noise estimate can be an estimate of the DTX noise included in the first touch signals, such as a bootstrap DTX noise estimate 704b described above with reference to FIG. 7. The second noise estimate can be generated by applying calibration data to the first noise estimate, for example. In some examples, the second noise estimate can be an estimate of the DTX noise included in non-bootstrap touch data 702d. For example, the electronic device can generate an estimate of the DTX noise in the bootstrap touch data 702a and use that estimate to estimate the DTX noise in the non-bootstrap touch data 702d, such as by applying a calibration coefficient 706b to the estimated DTX noise 704b in the bootstrap touch data 702a.

In some examples, the method 800 can further include subtracting 810 the first noise estimate from the first touch data to obtain third touch data. For example, the third touch data can be bootstrap touch data 710a with the DTX noise reduced or removed described above with reference to FIG. 7. As another example, the third touch data can be non-bootstrap touch data 710b with the DTX noise removed.

In some examples, the method 800 can further include performing 812 an action based on the third touch data. For example, the electronic device can perform an action based on the bootstrap touch data 710a with DTX noise reduced or removed and/or the non-bootstrap touch data 710b with the DTX noise reduced or removed.

Some examples of the disclosure are related to a touch screen, wherein the touch screen includes a plurality of touch electrodes, and one or more processors configured to perform a method comprising: performing a first touch sensing operation for a first duration of time; and performing a second touch sensing operation for a second duration of time different from the first duration of time; generating a noise estimate at a subset of the plurality of touch electrodes based on the first touch sensing operation and the second touch sensing operation; generating a noise estimate at the plurality of touch electrodes based on the noise estimate at the subset of the plurality of touch electrodes; identifying a touch pattern based on the noise estimate at the subset of the plurality of touch electrodes and the first touch sensing operation; and performing an action at the electronic device based on the identified touch pattern. Additionally or alternatively, in some examples, the plurality of touch electrodes are disposed at unique x, y locations of the touch screen. Additionally or alternatively, in some examples, generating the noise estimate at the plurality of touch electrodes based on the noise estimate at the subset of the plurality of touch electrodes includes up-sampling the noise estimate at the subset of the plurality of the touch electrodes. Additionally or alternatively, in some examples, the method further includes prior to performing the first touch sensing operation and second touch sensing operation: calibrating a spatial correlation of the noise, wherein the up-sampling of the noise estimate at the subset of the plurality of the touch electrodes is based on the spatial correlation. Additionally or alternatively, in some examples, the method further includes: prior to performing the first touch sensing operation and second touch sensing operation: selecting the subset of the plurality of the touch electronic device based on the spatial correlation of the noise. Additionally or alternatively, in some examples, the second duration of time is longer than the first duration of time. Additionally or alternatively, in some examples, the first touch sensing operation is performed at the plurality of touch electrodes, and the second touch sensing operation is performed at the subset of the plurality of touch electrodes. Additionally or alternatively, in some examples, performing the first touch sensing operation includes: applying first touch voltages to the plurality of touch electrodes for a first period of time; and integrating first charges of the plurality of touch electrodes for a second period of time, the first charges corresponding to first touch signals; and performing the second touch sensing operation includes: applying second touch voltages to the subset of touch electrodes for a third period of time different from the first period of time; and integrating second charges of the plurality of the subset of touch electrodes for a fourth period of time different from the second period of time, the second charges corresponding to second touch signals. Additionally or alternatively, in some examples, generating the noise estimate at the subset of the plurality of touch electrodes includes subtracting second touch signals obtained via the second touch sensing operation from first touch signals obtained via the first touch sensing operation. Additionally or alternatively, in some examples, identifying the touch pattern based on the noise estimate at the subset of the plurality of touch electrodes and the first touch sensing operation includes subtracting the noise estimate at the plurality of touch electrodes from first touch signals obtained via the first touch sensing operation.

Some examples of the disclosure are related to a method performed at an electronic device including a touch screen, wherein the touch screen includes a plurality of touch electrodes, the method comprising: performing a first touch sensing operation for a first duration of time; and performing a second touch sensing operation for a second duration of time different from the first duration of time; generating a noise estimate at a subset of the plurality of touch electrodes based on the first touch sensing operation and the second touch sensing operation; generating a noise estimate at the plurality of touch electrodes based on the noise estimate at the subset of the plurality of touch electrodes; identifying a touch pattern based on the noise estimate at the subset of the plurality of touch electrodes and the first touch sensing operation; and performing an action at the electronic device based on the identified touch pattern. Additionally or alternatively, in some examples, the plurality of touch electrodes are disposed at unique x, y locations of the touch screen. Additionally or alternatively, in some examples, generating the noise estimate at the plurality of touch electrodes based on the noise estimate at the subset of the plurality of touch electrodes includes up-sampling the noise estimate at the subset of the plurality of the touch electrodes. Additionally or alternatively, in some examples, the method includes prior to performing the first touch sensing operation and second touch sensing operation, calibrating a spatial correlation of the noise, wherein the up-sampling of the noise estimate at the subset of the plurality of the touch electrodes is based on the spatial correlation. Additionally or alternatively, in some examples, the method includes prior to performing the first touch sensing operation and second touch sensing operation: selecting the subset of the plurality of the touch electronic device based on the spatial correlation of the noise. Additionally or alternatively, in some examples, the second duration of time is longer than the first duration of time. Additionally or alternatively, in some examples, the first touch sensing operation is performed at the plurality of touch electrodes, and the second touch sensing operation is performed at the subset of the plurality of touch electrodes. Additionally or alternatively, in some examples, performing the first touch sensing operation includes: applying first touch voltages to the plurality of touch electrodes for a first period of time; and integrating first charges of the plurality of touch electrodes for a second period of time, the first charges corresponding to first touch signals; and performing the second touch sensing operation includes: applying second touch voltages to the subset of touch electrodes for a third period of time different from the first period of time; and integrating second charges of the plurality of the subset of touch electrodes for a fourth period of time different from the second period of time, the second charges corresponding to second touch signals. Additionally or alternatively, in some examples, generating the noise estimate at the subset of the plurality of touch electrodes includes subtracting second touch signals obtained via the second touch sensing operation from first touch signals obtained via the first touch sensing operation. Additionally or alternatively, in some examples, wherein identifying the touch pattern based on the noise estimate at the subset of the plurality of touch electrodes and the first touch sensing operation includes subtracting the noise estimate at the plurality of touch electrodes from first touch signals obtained via the first touch sensing operation.

Some examples of the disclosure relate to a non-transitory computer readable storage medium storing instructions that, when executed at an electronic device including a touch screen, wherein the touch screen includes a plurality of touch electrodes, causes the electronic device to perform a method comprising: performing a first touch sensing operation for a first duration of time; and performing a second touch sensing operation for a second duration of time different from the first duration of time; generating a noise estimate at the subset of the plurality of touch electrodes based on the first touch sensing operation and the second touch sensing operation; generating a noise estimate at the plurality of touch electrodes based on the noise estimate at the subset of the plurality of touch electrodes; identifying a touch pattern based on the noise estimate at the subset of the plurality of touch electrodes and the first touch sensing operation; and performing an action at the electronic device based on the identified touch pattern. Additionally or alternatively, in some examples, the plurality of touch electrodes are disposed at unique x, y locations of the touch screen. Additionally or alternatively, in some examples, generating the noise estimate at the plurality of touch electrodes based on the noise estimate at the subset of the plurality of touch electrodes includes up-sampling the noise estimate at the subset of the plurality of the touch electrodes. Additionally or alternatively, in some examples, the method further includes: prior to performing the first touch sensing operation and second touch sensing operation: calibrating a spatial correlation of the noise, wherein the up-sampling of the noise estimate at the subset of the plurality of the touch electrodes is based on the spatial correlation. Additionally or alternatively, in some examples, the method further includes: prior to performing the first touch sensing operation and second touch sensing operation: selecting the subset of the plurality of the touch electronic device based on the spatial correlation of the noise. Additionally or alternatively, in some examples, the second duration of time is longer than the first duration of time. Additionally or alternatively, in some examples, the first touch sensing operation is performed at the plurality of touch electrodes, and the second touch sensing operation is performed at the subset of the plurality of touch electrodes. Additionally or alternatively, in some examples, performing the first touch sensing operation includes: applying first touch voltages to the plurality of touch electrodes for a first period of time; and integrating first charges of the plurality of touch electrodes for a second period of time, the first charges corresponding to first touch signals; and performing the second touch sensing operation includes: applying second touch voltages to the subset of touch electrodes for a third period of time different from the first period of time; and integrating second charges of the plurality of the subset of touch electrodes for a fourth period of time different from the second period of time, the second charges corresponding to second touch signals. Additionally or alternatively, in some examples, generating the noise estimate at the subset of the plurality of touch electrodes includes subtracting second touch signals obtained via the second touch sensing operation from first touch signals obtained via the first touch sensing operation. Additionally or alternatively, in some examples, identifying the touch pattern based on the noise estimate at the subset of the plurality of touch electrodes and the first touch sensing operation includes subtracting the noise estimate at the plurality of touch electrodes from first touch signals obtained via the first touch sensing operation.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:
1. An electronic device comprising:
a touch screen, wherein the touch screen includes a plurality of touch electrodes, and
one or more processors configured to perform a method comprising:
  performing a first touch sensing operation for a first duration of time; and
  performing a second touch sensing operation for a second duration of time different from the first duration of time;
  generating a noise estimate at a subset of the plurality of touch electrodes based on the first touch sensing operation and the second touch sensing operation;
  generating a noise estimate at the plurality of touch electrodes based on the noise estimate at the subset of the plurality of touch electrodes;
  identifying a touch pattern based on the noise estimate at the subset of the plurality of touch electrodes and the first touch sensing operation; and
  performing an action at the electronic device based on the identified touch pattern.

2. The electronic device of claim 1, wherein the plurality of touch electrodes are disposed at unique x, y locations of the touch screen.

3. The electronic device of claim 1, wherein generating the noise estimate at the plurality of touch electrodes based on the noise estimate at the subset of the plurality of touch electrodes includes up-sampling the noise estimate at the subset of the plurality of the touch electrodes.

4. The electronic device of claim 3, wherein the method further includes:
prior to performing the first touch sensing operation and second touch sensing operation:
  calibrating a spatial correlation of noise, wherein the up-sampling of the noise estimate at the subset of the plurality of the touch electrodes is based on the spatial correlation.

5. The electronic device of claim 4, wherein the method further includes:
prior to performing the first touch sensing operation and second touch sensing operation:
  selecting the subset of the plurality of the touch electrodes based on the spatial correlation of the noise.

6. The electronic device of claim 1, wherein the second duration of time is longer than the first duration of time.

7. The electronic device of claim 1, wherein:
the first touch sensing operation is performed at the plurality of touch electrodes, and
the second touch sensing operation is performed at the subset of the plurality of touch electrodes.

8. The electronic device of claim 1, wherein:
performing the first touch sensing operation includes:
  applying first touch voltages to the plurality of touch electrodes for a first period of time; and
  integrating first charges of the plurality of touch electrodes for a second period of time, the first charges corresponding to first touch signals; and
performing the second touch sensing operation includes:
  applying second touch voltages to the subset of touch electrodes for a third period of time different from the first period of time; and
  integrating second charges of the plurality of the subset of touch electrodes for a fourth period of time different from the second period of time, the second charges corresponding to second touch signals.

9. The electronic device of claim 1, wherein generating the noise estimate at the subset of the plurality of touch electrodes includes subtracting second touch signals obtained via the second touch sensing operation from first touch signals obtained via the first touch sensing operation.

10. The electronic device of claim 1, wherein identifying the touch pattern based on the noise estimate at the subset of the plurality of touch electrodes and the first touch sensing operation includes subtracting the noise estimate at the plurality of touch electrodes from first touch signals obtained via the first touch sensing operation.

11. A method performed at an electronic device including a touch screen, wherein the touch screen includes a plurality of touch electrodes, the method comprising:
performing a first touch sensing operation for a first duration of time; and
performing a second touch sensing operation for a second duration of time different from the first duration of time;
generating a noise estimate at a subset of the plurality of touch electrodes based on the first touch sensing operation and the second touch sensing operation;
generating a noise estimate at the plurality of touch electrodes based on the noise estimate at the subset of the plurality of touch electrodes;
identifying a touch pattern based on the noise estimate at the subset of the plurality of touch electrodes and the first touch sensing operation; and
performing an action at the electronic device based on the identified touch pattern.

12. The method of claim 11, wherein:
performing the first touch sensing operation includes:
  applying first touch voltages to the plurality of touch electrodes for a first period of time; and
  integrating first charges of the plurality of touch electrodes for a second period of time, the first charges corresponding to first touch signals; and
performing the second touch sensing operation includes:
  applying second touch voltages to the subset of touch electrodes for a third period of time different from the first period of time; and
  integrating second charges of the plurality of the subset of touch electrodes for a fourth period of time different from the second period of time, the second charges corresponding to second touch signals.

13. A non-transitory computer readable storage medium storing instructions that, when executed at an electronic device including a touch screen, wherein the touch screen includes a plurality of touch electrodes, causes the electronic device to perform a method comprising:
   performing a first touch sensing operation for a first duration of time; and
   performing a second touch sensing operation for a second duration of time different from the first duration of time;
   generating a noise estimate at a subset of the plurality of touch electrodes based on the first touch sensing operation and the second touch sensing operation;
   generating a noise estimate at the plurality of touch electrodes based on the noise estimate at the subset of the plurality of touch electrodes;
   identifying a touch pattern based on the noise estimate at the subset of the plurality of touch electrodes and the first touch sensing operation; and
   performing an action at the electronic device based on the identified touch pattern.

14. The non-transitory computer readable storage medium of claim 13, wherein the plurality of touch electrodes are disposed at unique x, y locations of the touch screen.

15. The non-transitory computer readable storage medium of claim 13, wherein generating the noise estimate at the plurality of touch electrodes based on the noise estimate at the subset of the plurality of touch electrodes includes up-sampling the noise estimate at the subset of the plurality of the touch electrodes.

16. The non-transitory computer readable storage medium of claim 13, wherein the second duration of time is longer than the first duration of time.

17. The non-transitory computer readable storage medium of claim 13, wherein:
   the first touch sensing operation is performed at the plurality of touch electrodes, and
   the second touch sensing operation is performed at the subset of the plurality of touch electrodes.

18. The non-transitory computer readable storage medium of claim 13, wherein:
   performing the first touch sensing operation includes:
      applying first touch voltages to the plurality of touch electrodes for a first period of time; and
      integrating first charges of the plurality of touch electrodes for a second period of time, the first charges corresponding to first touch signals; and
   performing the second touch sensing operation includes:
      applying second touch voltages to the subset of touch electrodes for a third period of time different from the first period of time; and
      integrating second charges of the plurality of the subset of touch electrodes for a fourth period of time different from the second period of time, the second charges corresponding to second touch signals.

19. The non-transitory computer readable storage medium of claim 13, wherein generating the noise estimate at the subset of the plurality of touch electrodes includes subtracting second touch signals obtained via the second touch sensing operation from first touch signals obtained via the first touch sensing operation.

20. The non-transitory computer readable storage medium of claim 13, wherein identifying the touch pattern based on the noise estimate at the subset of the plurality of touch electrodes and the first touch sensing operation includes subtracting the noise estimate at the plurality of touch electrodes from first touch signals obtained via the first touch sensing operation.

* * * * *